May 22, 1956  C. A. BLAKESLEE  2,746,832
RECORDING AND INDICATING OR CONTROLLING INSTRUMENT
Filed May 10, 1952  3 Sheets-Sheet 1

*INVENTOR.*
CLINTON A. BLAKESLEE
BY
E. C. Sanborn
ATTORNEY

May 22, 1956  C. A. BLAKESLEE  2,746,832
RECORDING AND INDICATING OR CONTROLLING INSTRUMENT
Filed May 10, 1952  3 Sheets-Sheet 2
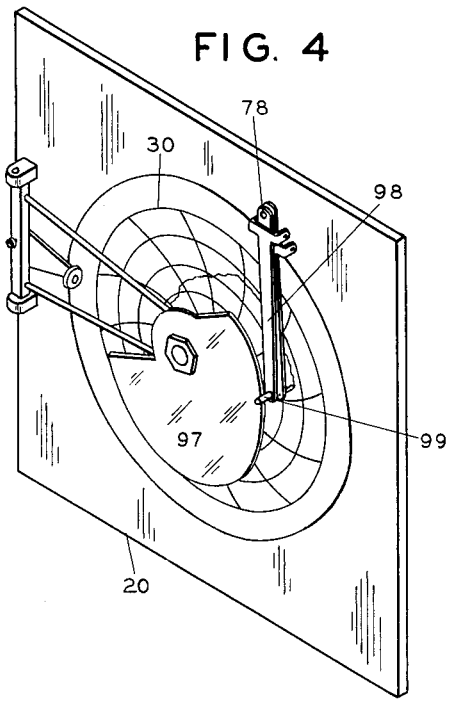
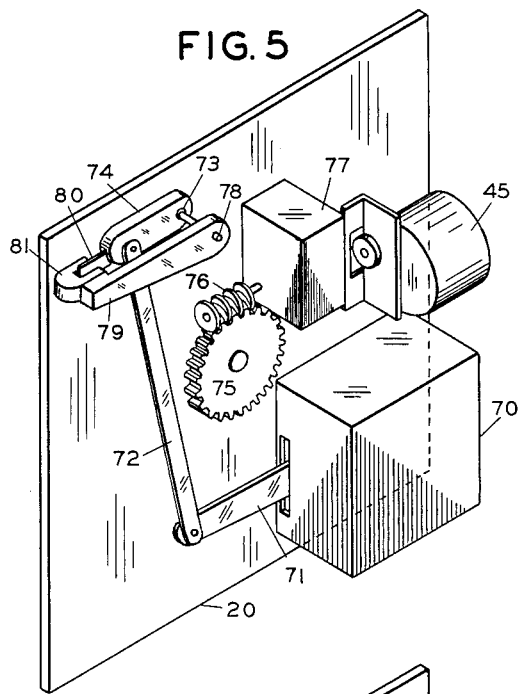
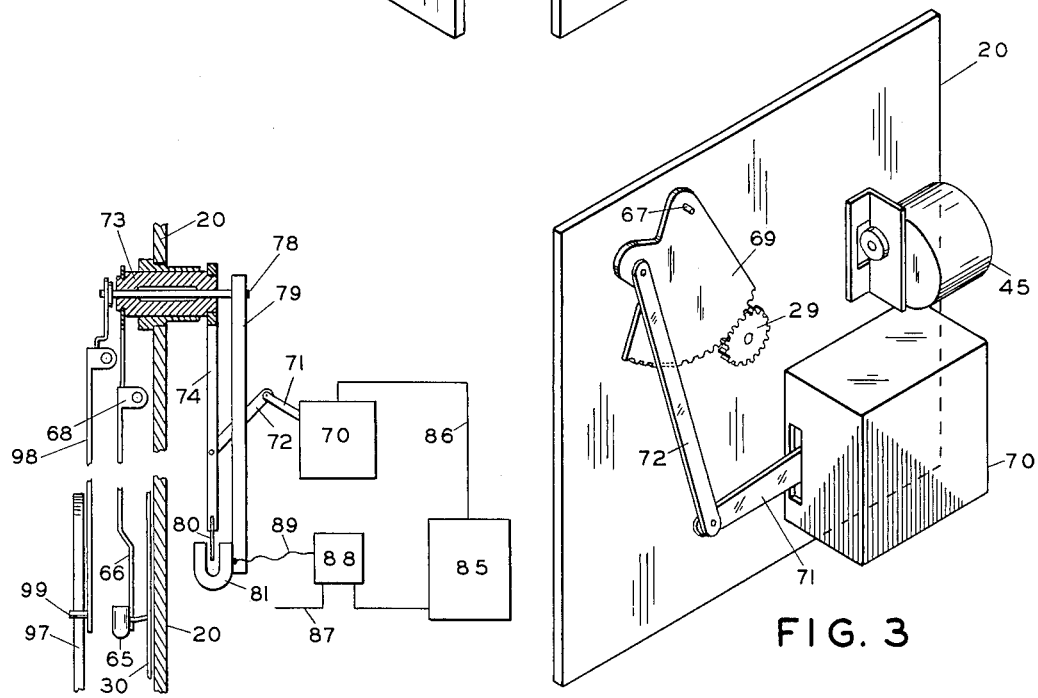
INVENTOR.
CLINTON A. BLAKESLEE
BY
E. C. Sanborn
ATTORNEY May 22, 1956
C. A. BLAKESLEE
2,746,832
RECORDING AND INDICATING OR CONTROLLING INSTRUMENT
Filed May 10, 1952
3 Sheets-Sheet 3
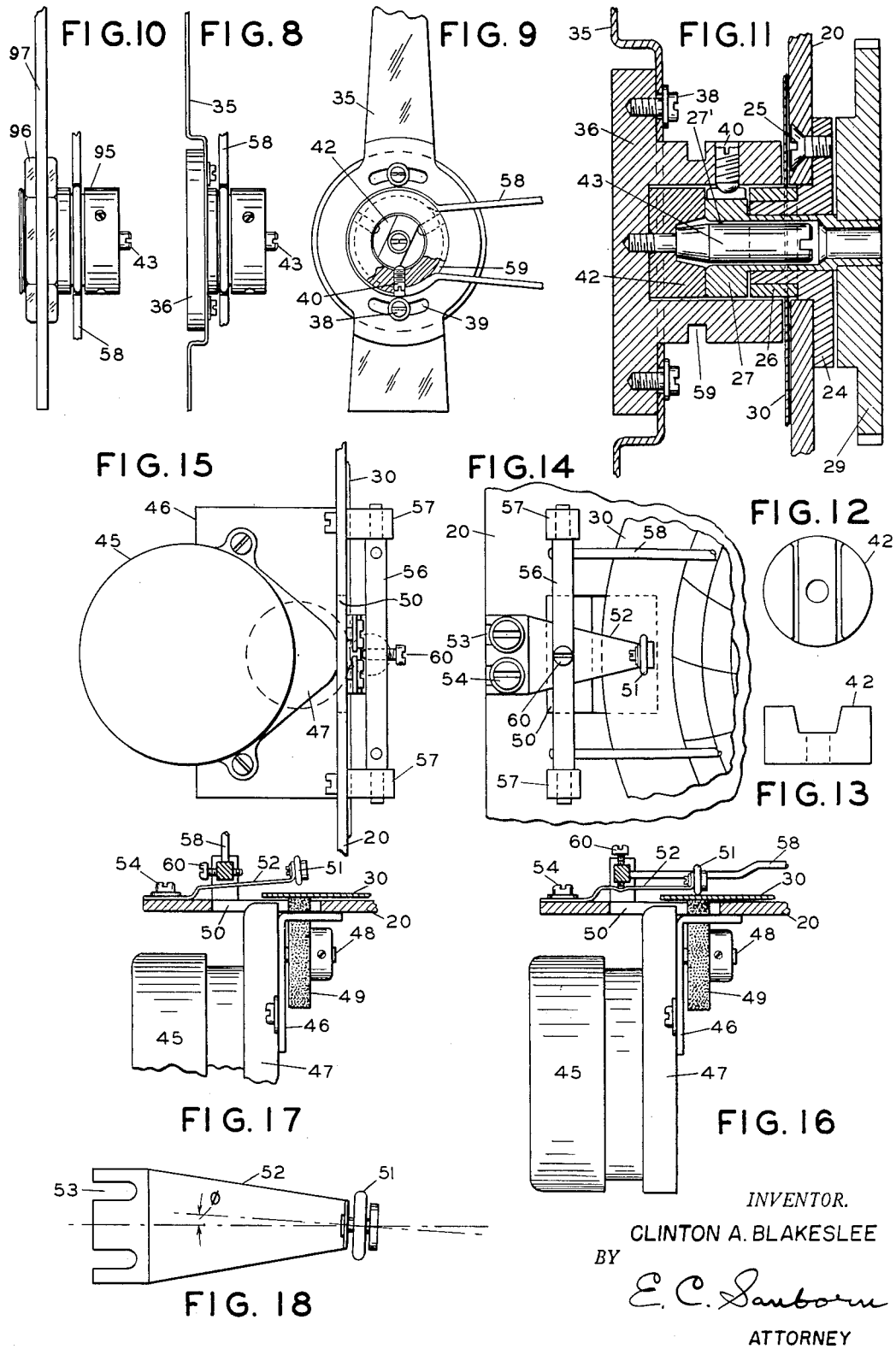
INVENTOR.
CLINTON A. BLAKESLEE
BY
E. C. Sanborn
ATTORNEY

United States Patent Office 2,746,832
Patented May 22, 1956

2,746,832

RECORDING AND INDICATING OR CONTROLLING INSTRUMENT

Clinton A. Blakeslee, Waterbury, Conn., assignor to The Bristol Company, Waterbury, Conn., a corporation of Connecticut Application May 10, 1952, Serial No. 287,203

19 Claims. (Cl. 346—17)

This invention relates to recording and to controlling instruments, and more especially to an instrument of this nature having a circular chart or the like adapted to receive a graph of a variable magnitude and wherein it is desired to provide an index or pointer displaceable about an axis concentric with the chart or the like and indicating on an arcuate dial in proximity to the periphery of the chart or the like. While the description of the instrument will be directed primarily to the form wherein a graphic record of a variable is progressively inscribed on a circular chart at the same time as a pointer provides an indication of the value of said variable on a concentric scale, there will also be set forth a form wherein, instead of a pointer, there is provided a cam of preterminal contour rotating concentrically with the chart at a predetermined velocity and adapted to engage and progressively position a follower operatively connected to one element of a control couple, the other element of which is positioned with the recording pen, whereby to constitute a program controller having distinct advantages hereinafter to be set forth.

In providing a circular-chart recording instrument with an index or pointer adapted to cooperate with graduated scale to produce an easily read indication of a measured quantity—usually that being recorded on the chart—the arrangement wherein the scale takes the form of arcuate dial concentrically disposed with respect to, and generally extending beyond, the periphery of the graduated portion of the chart, has met much favor from instrument designers; and a number of expedients have been tried with a view to solving the mechanical problems inseparable from such an arrangement. It is obvious that the plane of deflection of the pointer must lie to the front of the chart, and sufficiently removed therefrom to obviate possible interference with the action of the pen, stylus or other scribing member. It will also be apparent that provision must be made for removing the pointer when charts are being changed, and returning the same to its operating position without disturbing its register with the measuring part responsible for its positioning. It will furthermore be observed that provision must be made for causing the chart and the pointer to rotate about a common axis, the former continuously and at a uniform velocity in one direction, and the latter intermittently, with variable displacements, and in either direction.

In providing an instrument to incorporate the combined features of a predetermined "program," or progressive, control and a chart upon which is recorded the successive values of the controlled variable, it is desirable that the device for progressively varying the control point take the form of a cam having a follower to adjust the control point, the follower having an excursion to correspond to that of the recording pen or stylus, and the cam being superimposed upon the chart in such a manner that under ideal conditions the record obtained will be a substantial duplicate of the pattern of the periphery of the cam.

It is an object of the present invention to provide in a combined recording and indicating instrument means whereby a circular record chart and an indicating pointer deflectable in coaxial relationship thereto may be independently and non-interferingly operated, each in its particular manner.

It is a further object to provide means of the above nature in which the indicating pointer may at any time readily be removed, giving unrestricted access to the chart, and may as readily be replaced in operative engagement with its driving means and without loss of register or consequent disturbance of accuracy of indication.

It is a further object to provide an instrument of the above nature wherein by a minimum modification of the assembly, the indicating pointer may be replaced by a cam of predetermined contour adapted to engage, and position, a follower-arm deflectable about an axis coinciding with that of the recording member, whereby progressively to adjust the setting of a control member adapted to the regulation of the recorded variable.

In carrying out the purposes of the invention, it is proposed to provide a free-running center bearing for the chart, and to drive the latter from its periphery rather than its center, thus eliminating the need for positively rotating the chart-hub, and correspondingly simplifying the transmission of motion through a centrally located driving arbor to the pointer. It is further proposed to provide a pointer member which may be completely removed from said arbor, leaving the surface of the chart unobstructed, and to equip said pointer member with mechanical means for assuring positive register with said shaft, and with magnetic means for maintaining definite engagement between the coacting portions of said pointer member and said shaft.

Other features and advantages of the invention will be hereinafter described and claimed.

In the drawings:

Fig. 3 is an isometric rear view of the plate or frame upon which the principal elements of said instrument are mounted.

Figs. 4 and 5 are isometric front and rear views respectively of the mounting plate and essential elements of an instrument combining the functions of a recorder and a progressive controller, and embodying the principles of the invention.

Fig. 8 is a side view and Fig. 9 a rear view, partly in section, of the pointer and pointer mounting for the indicating form of the instrument.

Fig. 10 is a side view of the cam assembly which replaces the pointer assembly of Figs. 8 and 9 when the instrument is used as a progressive controller.

Fig. 11 is a sectional side elevation, to an enlarged scale, of the pointer mounting and the hub by which it is carried when in its operating position.

Figs. 12 and 13 are elevations of an element of the assembly shown in Fig. 11, as viewed from the front, and the side, respectively, of the instrument.

Figures 1, 2, 6, 7:
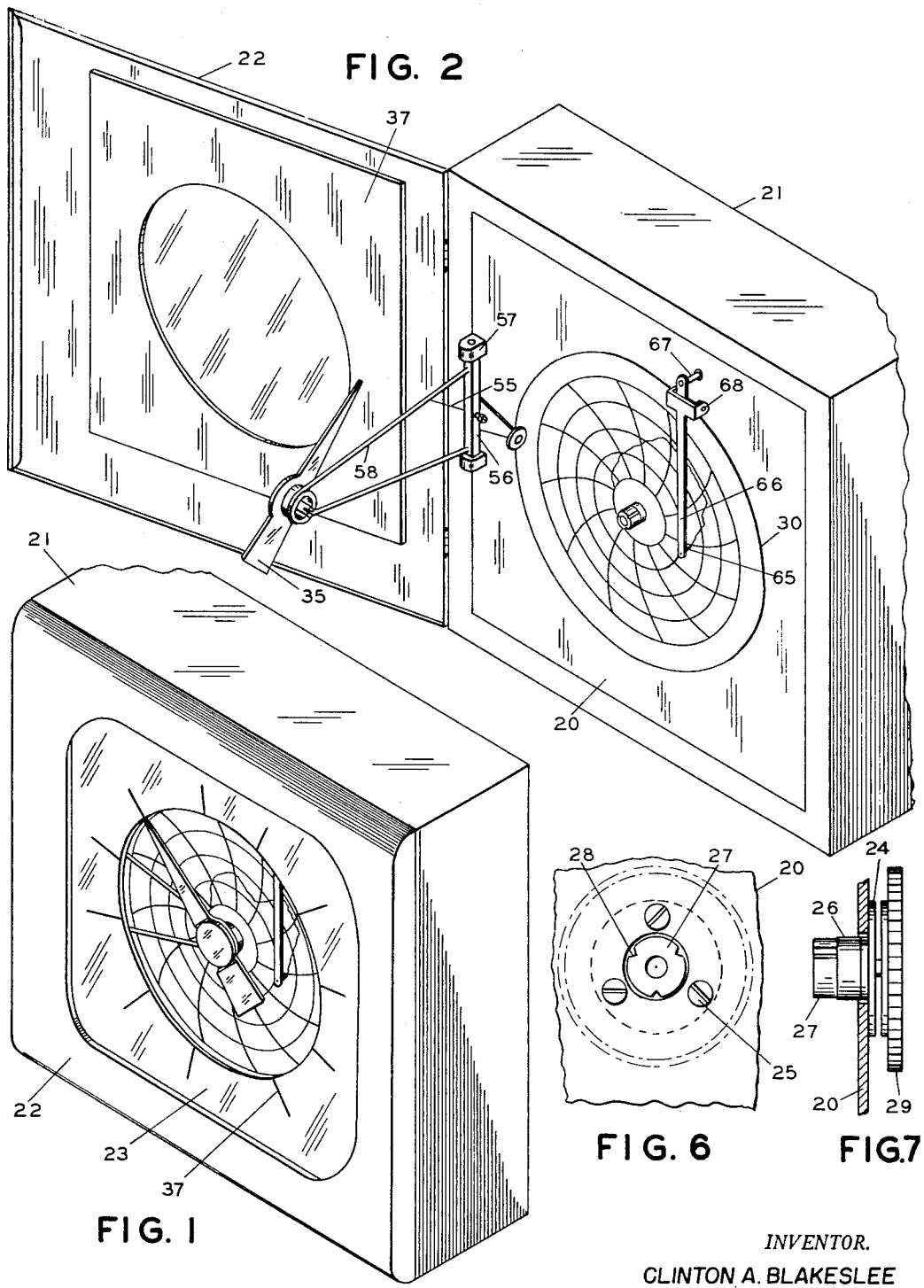
Figs. 1 and 2 are isometric representations, with the case closed and opened respectively, of an instrument of the combined recording and indicating class embodying the principles of the invention.
Fig. 6 is a front elevation, and Fig. 7 a side elevation, partly in section, of a detail of the instrument.

Figs. 14, 15, and 16 are front, end, and side, elevations, respectively, of the timing mechanism by which the recording chart is actuated.

Fig. 17 is a view similar to Fig. 16, but with cooperating parts in a relative position differing from that shown in Fig. 16.

Fig. 18 is a representation to an enlarged scale of a detail of the timing mechanism.

Fig. 19 is a view, partly in sectioned side elevation, and partly diagrammatic, of certain elements of the invention when adapted to the purposes of automatic regulation or control.

The general arrangement of an instrument incorporating the principles of the invention will be understood from the isometric representations of Figs. 1, 2 and 3. The operating parts of the instrument are carried by a frame or base-plate 20 hingedly mounted in an enclosing casing 21, and adapted to be swung out of the same in a horizontal plane, whereby to give access to the elements located on the rear of said plate. A hinged cover 22, shown closed in Fig. 1 and open in Fig. 2, completes the protective enclosure for the instrument, and is ordinarily provided with a suitable centrally located glazed opening or window 23 whereby the scale, pointer, chart, etc., of the instrument will be visible when the cover is closed.

Centrally positioned on the frame or base-plate 20 is a hollow hub member 24 (see Figs. 6, 7 and 11) having at the rear of said plate a flanged portion whereby it may be secured to the plate as by screws 25 passing through from the front, and having projecting through an opening in the plate a cylindrical journal portion adapted to provide a bearing for an annular collar member 26. The internal diameter of said collar is such as to provide a running fit on the journal portion of the hub member 24, and the external diameter of the same is made such as to provide a tight fit for the standardized internal opening of the type of circular chart for which the instrument is designed. Longitudinal dimensions of the hub 24 are such that it provides an annular recess in conjunction with the central opening in the plate 20, in which annular recess the collar 26 rests with one end positioned inwardly of the front surface of said plate. This prevents the chart from being forced too far on to the collar and slipping over the inner end thereof. Passing through the hollow hub member 24 and journaled therein for free rotation, is an arbor, 27, formed preferably of "mild" steel or other material having relatively high magnetic permeability. The forward extremity of the arbor 27 takes the form of a flange portion adapted to engage the forward end of the hub member 24 and incidentally to constrain the collar 26 against axial displacement. The flange portion of the arbor 27 is provided with several (three, for example) axial grooves or splines 28, distributed about its periphery with non-symmetrical spacing, so that a mating member presently to be described, can engage said flange in only one predetermined circumferential relationship. The front end of the flange portion of the arbor 27 is finished to a smooth substantially plane surface perpendicular to the axis of said member.

Carried by the rearward extremity of the arbor 27 is a gear member 29 integrally secured thereto, as by staking. The manner in which this gear member is coordinated with other elements of the mechanism will hereinafter be set forth. The arbor 27 is provided with an opening 27', bored at least part way through said member and centered on its axial line. In operation, a circular chart 30 formed of paper or other suitable material is forced along the exterior of the annular collar 26 to lie against the front surface of the plate 20 with its central opening tightly engaging the periphery of said collar, whereby the latter, freely rotatable on the hub member, provides a solid bushing and a free-running center bearing for the chart.

Indicating means are provided in the combination of an extended pointer member 35 secured to a flanged knob member 36 having a rearwardly extended boss provided with an internal recess bored to a diameter to pass freely over the flanged portion of the arbor 27 and to have a running clearance for the collar 26. Mounted upon the interior of the swinging door 22 and externally visible through the window 23 is a circular graduated scale 37. The pointer 35 is so disposed with respect to the knob 36 that when the latter is in its operating position as hereinafter defined, and the door of the instrument closed, the extremity of said pointer will lie in substantially the same plane as said scale, whereby to provide a readily observable indication of the deflected position of said pointer. Attachment of the pointer 35 to the knob member 36 is effected preferably, as shown in Figs. 9 and 11, by means of screws 38 passing through arcuate slots 39 in the pointer member and threaded into the rear surface of the flanged portion of said knob. This provides for limited angular adjustment of the pointer with respect to the knob, and therefore in relation to the mechanism by which said knob is positioned.

A plurality of set screws 40, radially threaded into the boss portion of the knob member, are disposed with angular circumferential spacings to correspond to those of the splines 28 in the arbor 27. The points of said screws are conformed to engage the walls of said splines, so that when radially adjusted to a proper degree they will have a running fit thereon, thus providing positive register in one preselected circumferential relationship between said knob and said arbor without in any way constraining said parts against relative axial displacement.

Positioned within the recess in the knob member 36 is a magnet member 42, preferably of circular outline to fit within said recess, and of cylindrical conformation, and having two similarly directed axial projections of segmental section separated by a deep diametrical groove. The magnet member 42 may be formed of high-coercive-force material (such as a member of that group of alloys known by the trade name "Alnico") suited to the concentration of relatively great magnetic force in a restricted space. Magnetization of the member 42 is effected in such a manner that the two axial projections form north and south poles respectively, comprising the equivalent of a bipolar, or "horseshoe" magnet. Through an axially formed opening in the yoke portion of the magnet 42 is passed a centering screw 43 having an enlarged cylindrical stem, and being threaded into an axially tapped hole at the base of the recess in the knob member 36, whereby to secure said magnet within the bottom of the recess. The stem of the screw 43 is formed to a clearance fit within the axial opening 27' in the arbor 27, whereby to center the knob member and the pointer 35 carried thereby with the arbor 27 and the hub 24 when the knob member is slipped into place over the assembly of said arbor and hub. As mentioned hereinbefore, the diameter of the recess in the knob 36 is made sufficiently great to provide a free running clearance for the collar 26 which carries the chart 30. The axial dimensions of the magnet 42 are made such that when it is secured in the bottom of the recess in the knob member and the latter placed over the arbor 27 and moved inwardly thereon to the limit of motion as established by engagement of the magnet and the arbor, representing the operating position of the knob member 36, the inner face of the boss on the knob member will serve to retain the central portion of the chart 30 flat against the plate 20 but without clamping action, so that the chart and the collar 26, which forms a bushing therefor, may be rotated freely about the hub 24 while at the same time constrained against substantial displacement in a sense perpendicular to the face of the chart. Magnetic engagement of the steel arbor 27 by the magnet member 42 provides a clamping action, which, while not contributing appreciably to rotation of the knob 36, maintains the same in a condition where the screws 40 are in positive engagement with the splines 28 in the arbor 27, whereby any angular displacement of said arbor will be positively communicated to said knob and pointer.

Rotation of the chart is effected, not by driving the hub in the conventional manner, but by frictionally applying a tangential force near the rim. The timing device by which this is affected is best shown in Figs. 14, 15, 16 and 17. Mounted on the rear face of the plate 20 is a timing motor 45, which may be some one of the available types of synchronous clock motors, or may be a conventional spring-driven clock. The mounting may expediently take the form of a bracket 46, carried by said plate and to which the timing motor is secured. The timing motor 45 is provided with a suitable gear train, enclosed in a casing 47 and terminating in an output shaft 48 to which is fixed a drive wheel 49. The wheel 49 projects through an opening 50 in the plate 20 so that its periphery is substantially flush with the front face thereof, whereby the wheel will make contact with the rear surface of the chart 30 at a point near the rim of the latter and preferably between the outer graduation and the edge of the paper. The periphery of the wheel 49 is slightly roughened, as by sandblasting, whereby to provide frictional engagement with the chart as the latter is pressed into engagement with the wheel; and the positioning of the clock assembly is such that force transmitted to the chart by friction from the drive wheel will be in a sense substantially perpendicular to the engaged radius of the chart.

Positive frictional engagement between the chart 30 and the drive wheel 49 is provided by means of a small wheel or roller 51 pivotally mounted, with its axis substantially parallel to that of the clock shaft 48, upon the free extremity of a leaf spring 52 secured to the plate 20 and projecting over the edge of the chart. The spring 52 is normally biased away from the mounting plate 20, but, by means presently to be described, this bias is overcome and the roller 51 is urged into contact with the forward surface of the chart, pressing the latter into engagement with the wheel 49. The roughened surface of the drive wheel 49 extends an appreciable distance axially of said wheel, or radially of the chart 30; and the engaging rim of the wheel or roller 51, being formed to a V section, or given a "barrel taper," or turned to a substantially spherical curvature, provides substantially a line contact with the front of the chart 30 to press the rear surface thereof against the drive-wheel 49, thus defining the effective radius of action of said wheel upon the chart, and thereby establishing the angular speed of the chart about its center of rotation. The stationary extremity of the leaf spring 52 is provided with longitudinal slots 53, and is secured to the plate 20 by screws 54, passing therethrough, thus providing an adjustment whereby the effective radius of application of tangential driving force to the circumference of the chart, and hence the angular speed of the same, may be varied, and adjusted to correct timing.

Experience has shown it to be expedient that, instead of having the axis of the roller 51 exactly parallel to the radius of the chart 30, said axis be slightly skewed in a plane parallel to said chart, through a small angle, as shown to an exaggerated scale in Fig. 18, whereby the force applied to the chart by the drive wheel will contain a slight outward radial component, tending to maintain the chart in tension and avoid any tendency of the paper to buckling or wrinkling as it rotates. It has been found that effective and satisfactory performance is obtained when the angle is given a value of from 2° to 5°.

Support for the knob 36 and the pointer 35 carried thereby, when not in operating position on the arbor 27, is provided by a swingable bracket 55 comprising a hinge member 56 journalled in bearing members 57 secured to the plate 20 to define a vertical axis of rotation theerfor, and a cantilever arm 58 formed of stiff wire in the form of a horizontally extended loop having its open extremities secured to the hinge member 56 and having its looped end formed to an arc subtending an angle of more than 180 degrees and adapted to lie loosely in a circumferential groove 59 on the hub of the knob member 36. When the knob is in its operating position on the arbor 27, the looped portion of the wire arm 58 in no way interferes with free rotation of the knob. When the knob is removed from the arbor, said looped portion, more than half encircling said knob, constrains and forms a support therefor, permitting the knob and parts carried thereby to be swung about the axis of the hinge member in a horizontal plane away from the record chart, as shown in Fig. 2, leaving the front of the chart free from obstruction. The angle by which the loop encircles the hub, lying in the groove 59, is made such that, while the loop normally constrains the hub, the wire may be sprung open sufficiently to free the hub and allow it and the pointer to be removed from the instrument.

The bearing members 57 in which the hinge member 56 is journaled are so positioned that the latter passes in front of the leaf spring 52. An adjustable screw 60 is threaded through the member 56 in such a manner that when the bracket assembly 55 is rotated to the position corresponding to operative engagement between the knob 36 and the arbor 27, the screw 60 will press upon the spring 52, overcoming its normal bias, forcing the roller 51 into contact with the chart 30 and thereby establishing an operative driving engagement between the chart and the drive wheel 49, as indicated in Fig. 16. When the knob 36 is removed from the arbor 27, and the bracket 55 swung away from the chart, the screw 60, turning about the axis of the hinge member 56 with rotation of the same, will move out of engagement with the spring 52, and the latter, biased away from the mounting plate 20, will lift the roller 51 away from the surface of the paper, as shown in Fig. 17, thus disengaging the chart from the timing motor and leaving the record free for replacement or other attention.

A stylus or pen member 65, carried on the extremity of an extended pen-arm 66 having a spindle 67 suitably journaled in the plate 20, provides means for producing a continuous record on the chart 30. The pen-arm 66 may be provided with an adjustable removable hinged mounting element 68, as fully set forth and described in U. S. Letters-Patent No. 2,078,763, granted to Walter N. Hubbard April 27, 1937. The method by which the pen-arm 66 and the indicating pointer 35 are operatively coordinated with each other and with a measuring element whose measurement it is desired to record and to indicate will now be described.

Referring to Fig. 3, it will be seen that the spindle 67 projects through the mounting plate 20 to the rear thereof and carries a gear sector 69 which meshes with the gear member 29 on the rear end of the arbor 27. The ratio between said gear sector and gear member is made such that as the former is deflected through an angle corresponding to a complete excursion of the pen member 65 across the scale of the chart the latter will be rotated through an angle corresponding to the graduated portion of the circular scale 37. As a typical example, these angles may be taken as 40° and 320° respectively, which angular deflections would be coordinated by gearing having a ratio of 8/1.

A measuring mechanism 70, adapted to quantitative determination of the variable to be recorded and indicated, is mounted on the rear face of the plate 20 and is provided with an angularly displaceable arm 71 adapted to be deflected by said mechanism into a position representative of the value of the measured variable. A link member 72, pivotally attached to the extremity of the arm 71 and to the gear sector 69 at a suitable point, provides operative connection between said measuring mechanism and the hereinbefore described recording and indicating means, whereby they may be at all times presented a record and an indication of the values of said variable.

From the description which has been given, the operation of the apparatus will be almost self-apparent. Angular displacement of the arm 71 of the measuring mechanism will be transmitted through the link 72 to the gear sector 69, and thence through the spindle 67 to the pen-arm 66, whereby the recording pen or stylus 65 will at all times assume on the graduated chart 30 a position representative of the measured quantity. The chart, being frictionally driven from the timing motor 45 through the drive-wheel 49, and being positively centered by the collar 26 which turns freely upon the hub 24, will rotate at a constant predetermined angular velocity, whereby the pen 65 will inscribe thereon a continuous record of the successive values of the measured quantity. The arbor 27, being operatively engaged with the pen arm 66 through the gears 68 and 29, will assume angular positions proportional to those of the pen arm, so that the pointer 35, being positively registered with said arbor by engagement of the screws 40 in the knob 36 with the splines 28 in the arbor, will at all times provide on the scale 37 an indication of the then deflection of the recording member.

The knob 36, being held in its operating position solely by the magnetic force between the magnet 42 and the arbor 27, may at any time be removed therefrom by a straight axial pull of sufficient force to overcome that of the magnet, whereupon the screws 40 will slide along the splines 28, and the knob and pointer will swing free, supported only by the bracket 55. Upon replacing the knob and pointer assembly upon the arbor 27, the arbor can enter the recess in the knob only when the latter is rotated to a position where the screws 40 register with the splines 28, which, because of the asymmetrical arrangement of said screws and splines, can take place with but one predetermined angular relationship of the coacting elements. When the screws and the splines are properly registered, the knob will slide easily into position upon the arbor, where it will be retained by the force of the magnet 42, and where the pointer 35 will provide an indication of the displacement of the recording pen.

Adaptation of the principles of the invention to the combination of a recording instrument with a progressive, or program, controller is best shown in Figs. 4 and 5 (illustrating front and rear isometric views respectively), Fig. 10, (showing a detail wherein the assembly differs from that hereinbefore set forth), and in Fig. 19 which depicts the relationship between the mechanism of the instrument and controlling instrumentalities subject thereto. The arrangement and mounting of the chart and the means for driving the same, are identical with those already set forth. The pen-arm 66, carrying the recording pen or stylus 65, instead of being mounted on a spindle, is secured to a hollow shaft 73 suitably journaled in the mounting plate 20. To the rearward extremity of the shaft 73 is attached an arm 74, and at a suitable point on said arm is pivotally attached the link 72 actuated by the angularly displaceable arm 71 of the measuring mechanism 70, whereby there is provided means for moving the recording pen 65 on the chart 30 in response to variations in the measured quantity, and thus providing on said chart a continuous record of the values of said variations in a manner substantially identical with that set forth for the previously described embodiment of the invention.

The arbor 27, instead of being provided with means to effect its angular displacement through a limited range with deflection of the measuring element, is fitted at its rearward extremity with a worm gear 75 adapted to mesh with a worm 76 driven from a constant-speed motor or clock 77, whereby said arbor will be rotated continuously at a predetermined constant velocity. While the constant-speed motor or clock unit 77 has been shown as separate from the chart motor 45, the use of two such units is solely a matter of design. There is no technical reason why one or the other of these units could not be eliminated, and the arbor and the chart driven by a common clock mechanism.

Coaxially within the hollow shaft 73 is journaled a spindle 78, carrying upon its rear extremity a cantilever arm 79. Cooperatively mounted upon the arms 74 and 79 respectively are the elements 80 and 81 of a control couple, adapted to coact with auxiliary apparatus forming no part of the present invention, to regulate the magnitude of the measured variable according to the relative position of said elements. The control couple may be of any one of a variety of available types well known in the art. It may be embodied in a vane-and-jet assembly of the nature fully set forth and described in U. S. Letters Patent No. 1,880,247, granted October 4, 1932, to A. R. Mabey et al., and also in U. S. Letters Patent No. 2,000,739, granted May 7, 1935, to C. W. Bristol et al. Alternatively, said couple may take the form of solid metal electrical contacts, as also shown in said Bristol et al. patent, or of a rheostat or voltage divider as indicated in U. S. Letters Patent No. 2,386,799, granted October 16, 1945, to W. L. Hunt, and in which patent, incidentally, said voltage divider is shown in combination with contacts similar to those disclosed in said Bristol et al. patent. As a further alternative, the control couple may incorporate relatively movable members adapted to vary the characteristics of an electronic control network and thereby effect a regulatory function. Such a combination is set forth in U. S. Letters Patent No. 2,234,184, granted March 11, 1941, to F. B. MacLaren, Jr.

Fig. 19 includes a functional diagram of a control system exemplifying the action of the control couple in relation to the measured variable. The numeral 85 designates a body or an enclosed space, the condition of which is to be measured and controlled. Operative connection is provided by means of an electrical, or fluid, or other, channel 86 to the measuring mechanism 70, whereby to produce angular deflection of the arm 71 as a measure of said condition. From a source 87, admission of a condition-affecting agent to the body of space 85 is regulated through a valve or other suitable control portal 88. Operative connection between the portal 88 and the control couple comprising the elements 80 and 81 is provided by an electrical or fluid channel 89, whereby the degree to which the condition-affecting agent is admitted to the body or space 85 is rendered subject to the relative position of said control elements. The control system has been described in a purely functional sense; and since as herein before stated, it forms no essential part of the invention, it need not here be specified or considered in any further detail. Whatever the nature of the control system and of the monitoring control couple, the device will be so proportioned and arranged that upon deviation of the arms 74 and 79 from a predetermined relative position the subservient control instrumentalities will be so actuated as to modify the supply of condition-affecting agent in a sense, and to a degree to bring the arm 74, as actuated by the measuring mechanism 70, to its predetermined relationship with the arm 79. Thus, should the variable under control change its value, or should the arm 79 be shifted, the control system will become active to restore said relationship.

In the form of the invention now under consideration, the knob 36, which carried the pointer 35 in the previously discussed form, is replaced by arbor 95, shown in Fig. 10, having a rearwardly extended portion identical in all respects (including the contained magnet 42) with the recessed boss of the knob 36, but having a threaded forward end, fitted with a nut 96 adapted for securing thereon in clamped relationship a cam member 97. The arbor 95, like the knob 36, is adapted to be supported by the bracket member 55 when swung away from the front of the plate 20, and to be operatively engaged by the arbor 27 in a single predetermined angular relationship, and there to be secured by interaction of the magnet 42 with the extremity of said last-named arbor. When the arbor 95 is thus secured in its operating position, the cam member 97 carried thereby is adapted to be rotated in a plane parallel to, and substantially forward of, the plane of deflection of the pen-arm 66. The cam member is shaped to have a peripheral contour representing a chart record of the cycle which it is desired that the successive values of the measured and controlled variable shall follow. The cam may be formed of thin metal, or preferably of a transparent acrylic resin, whereby to provide an unobstructed view of the whole surface of the record chart behind the cam.

Secured to the spindle 78 at its forward extremity is a follower-arm 98 carrying a cam follower 99 adapted to rest upon the periphery of the cam member 97 whereby with rotation of said cam member correspondingly to position said follower-arm, and, through the spindle 78, the arm 79 which carries the element 81 of the control couple. Thus, when the cam member 97 is positioned on the arbor 27 and the follower 99 engaged therewith, the cam by its continuous rotation will cause the follower to be progressively deflected to a series of positions determined by the conformation of the cam, whereby the arm 79 will simultaneously assume corresponding positions, resulting in a progressive setting of the control point as determined by the relative position of the elements 80 and 81 of the control couple. The regulated variable will then tend to follow a series of values corresponding to those represented by the periphery of the cam, and the movements of the recording pen or stylus will tend to duplicate those of the cam follower 99. Thus, if the cam and the chart be made to have identical speeds of rotation—as would ordinarily be the case—the recording pen under ideal conditions, will inscribe on the latter a pattern which will be a duplicate of the conformation of the periphery of the former.

The terms and expressions which I have employed are used as terms of description and not of limitation, and I have no intention, in the use of such terms and expressions, of excluding any equivalents of the features shown and described or portions thereof, but recognize that various modifications are possible within the scope of the invention claimed.

I claim:

1. In an instrument for producing upon a circular chart a record of a measured variable, a mounting frame, a bearing member secured thereto and having two coaxially disposed bearing surfaces, means journaled upon one of said bearing surfaces and adapted centrally to engage said chart to rotate therewith and to provide a free-running bearing therefor, timing means near the periphery of said chart adapted to engage the same to drive it at a constant angular velocity, a recording member adapted to inscribe a record upon a surface of said chart, a measuring element, mechanical means interconnecting said recording member and measuring element to render the former responsive to measurements performed by the latter, an arbor journaled upon the other of said bearing surfaces, a removable member adapted to engage said arbor and to be wholly supported thereby for rotation therewith, means comprising a splined surface on said arbor and means on said removable member adapted to engage said splined surface in only one angular position with respect thereto, to provide a positive mechanical drive for controlling said removable member, means for retaining said member in engagement with said arbor by exerting a wholly axial force therebetween, an element carried by said removable member for angular displacement therewith, reference means cooperating with the last mentioned element to provide a measurable effect dependent upon the angular position of said element, and means for imparting significant angular displacement to said arbor.

2. In an instrument for producing upon a circular chart having a central opening a record of a measured variable, a mounting frame, a hub secured thereto and having coaxial external and internal bearing surfaces, an annular bushing journaled upon said outer bearing surface and externally dimensioned to fit tightly the central opening in said chart, whereby to rotate therewith and provide a free-running bearing therefor, timing means near the periphery of said chart and adapted to engage the same to drive it at a constant angular velocity, a recording member adapted to inscribe a record upon a surface of said chart, a measuring element, mechanical means interconnecting said recording member and measuring element to render the former responsive to measurements performed by the latter, an arbor journaled within said hub, a removable member adapted to engage said arbor and to be wholly supported thereby for rotating therewith, means comprising a splined surface on said arbor and means on said removable member adapted to engage said splined surface in only one angular position with respect thereto, to provide a positive mechanical drive for controlling said removable member, means for retaining said member in engagement with said arbor by exerting a wholly axial force therebetween, an element carried by said removable member and secured thereto for angular displacement therewith, reference means cooperating with the last mentioned element to provide a measurable effect dependent upon the angular position of said element, and means for imparting significant angular displacement to said arbor.

3. In an instrument for producing upon a circular chart having a central opening a record of a measured variable, a mounting frame, a hub secured thereto and having coaxial external and internal bearing surfaces, an annular bushing journaled upon said outer bearing surface and externally dimensioned to fit tightly the central opening in said chart, whereby to rotate therewith and provide a free-running bearing therefor, timing means near the periphery of said chart and adapted to engage the same to drive it at a constant angular velocity, a recording member adapted to inscribe a record upon a surface of said chart, a measuring element, mechanical means interconnecting said recording member and measuring element to render the former responsive to measurements performed by the latter, an arbor extending through and journaled within said hub, said hub extending between and separating the bearing surface of said annular bushing and said arbor, a removable member adapted to engage said arbor and to be wholly supported thereby for rotating therewith, means for establishing register between said removable member and said arbor in a single relative position, said last-mentioned means comprising at least one groove extending longitudinally of said arbor on the exterior surface thereof, and inwardly-extending means on said removable member adapted to engage and fit said groove, magnetic means for retaining said member in engagement with said arbor by exerting a wholly axial force therebetween, an element carried by said removable member and secured thereto for angular displacement therewith, reference means cooperating with the last mentioned element to provide a measurable effect dependent upon the angular position of said element, and means for imparting significant angular displacement to said arbor.

4. In a combined controlling and recording instrument for regulating a measured variable according to a preestablished program and continuously recording the values thereof on a circular chart, a mounting member, a centrally bored hub secured thereto, an annular bushing journaled upon said hub and externally dimensioned to fit tightly the central opening in said chart whereby to provide a free-running bearing therefor, constant-speed timing means near the periphery of said chart and adapted to engage and drive the same at a constant angular velocity, a recording member adapted to inscribe a record on the surface of said chart, a measuring element, mechanical means connecting said recording member and measuring element to render the former positionally responsive to measurements performed by the latter, an arbor extending through and journaled within the opening in said hub, a cam member removably mounted upon said arbor and having the contour of its periphery conformed to represent a predetermined program of control values, means for rotating said arbor at a constant velocity, a cam-follower pivotally mounted with respect to said mounting member and adapted to follow the contour of said cam, and a control-couple adapted to regulation of said measured variable according to the relative position of its component control members, one of said control-couple members being displaceable with said cam follower and the other being displaceable by said measuring element.

5. In an instrument for indicating values of a measured variable and continuously recording said values on a circular chart, a mounting member, a centrally bored hub secured thereto, an annular bushing journaled upon said hub and externally dimensioned to fit tightly the central opening in said chart whereby to provide a free-running bearing therefor, constant-speed timing means near the periphery of said chart and adapted to engage and drive the same at a constant angular velocity, a recording member adapted to inscribe a record on the surface of said chart, a measuring element, mechanical means connecting said recording member and measuring element to render the former positionally responsive to measurements performed by the latter, an arbor journaled within the opening in said hub, a removable member adapted to engage said arbor and to be wholly supported thereby for rotation therewith, means comprising a splined surface on said arbor and means on said removable member adapted to engage said splined surface in only one angular position with respect thereto, to provide a positive mechanical drive for controlling said removable member, a stationary scale adjacent said chart, a pointer carried by said removable member and secured thereto for angular displacement therewith and cooperating with said scale to produce an indication commensurate with the angular position of said pointer, and means connected to said measuring element for operating said arbor.

6. In an instrument for producing upon a circular chart a record of a measured variable, a mounting frame, a bearing member secured thereto and having two coaxially disposed bearing surfaces, means journaled upon one of said bearing surfaces and adapted centrally to engage said chart to rotate therewith and to provide a free-running bearing therefor, timing means near the periphery of said chart adapted to engage the same to drive it at a constant angular velocity, a recording member adapted to inscribe a record upon a surface of said chart, a measuring element, mechanical means interconnecting said recording member and measuring element to render the former responsive to measurements performed by the latter, an arbor journaled upon the other of said bearing surfaces, a removable member adapted to engage said arbor and to be wholly supported thereby for rotation therewith, means comprising a splined surface on said arbor and means on said removable member adapted to engage said splined surface in only one angular position with respect thereto, to provide a positive mechanical drive for controlling said removable member means for retaining said member in engagement with said arbor by exerting a wholly axial force therebetween, a stationary scale adjacent said chart, a pointer carried by said removable member and secured thereto for angular displacement therewith and cooperating with said scale to produce an indication commensurate with the angular position of said pointer, and means connected to said measuring element for operating said arbor.

7. In an instrument for producing upon a circular chart a record of a measured variable, a frame, a mounting on said frame providing a free-running central bearing for said chart, means engageable with the periphery of said chart for rotating the latter at constant angular velocity about the axis of said central bearing, a recording member adapted to inscribe a visual record upon a surface of said chart, a measuring element, means connecting said recording member and said measuring element to render the former responsive to measurements performed by the latter, rotary means extending through said mounting and journaled therein for rotation about said central bearing axis, a removable member positively engageable with said rotary means, splined means for establishing register between said removable member and said rotary means in a single relative position, a stationary scale element adjacent said chart, a pointer carried by said removable member for angular displacement therewith and cooperating with said scale to produce an indication commensurate with the angular position of said pointer, and means connected to said measuring element for operating said rotary means.

8. In an instrument for producing upon a circular chart a record of a measured variable, constant speed motor means, a wheel operable by said motor means and engageable with a surface of said chart adjacent the periphery thereof, a roller engageable with the opposite surface of said chart, and means for urging said roller toward the last mentioned surface for pressing said chart against said wheel, and means for varying the position of said roller radially of said chart to regulate the speed of the latter.

9. In an instrument for producing upon a circular chart a record of a measured variable, constant-speed motor means, a wheel operable by said motor means and engageable with a surface of said chart adjacent the periphery thereof, a roller engageable with the opposite surface of said chart, and means maintaining said roller with its axis at a slight angle to a radius of said chart for imparting an outward force component to said chart to maintain the latter flat during rotation thereof.

10. In an instrument for producing upon a circular chart a record of a measured variable, a mounting frame, a hub on said frame, a collar mounted for free rotation on an exterior surface of a portion of said hub, the exterior surface of said collar being of such diameter as to be tightly engageable with the central opening of said chart, timing means engageable with said chart near its periphery for driving said chart at constant angular velocity, a deflectable member, means extending through said hub for deflecting said member, and reference means cooperating with said deflectable member to provide a measurable effect.

11. In an instrument for producing upon a circular chart a record of a measured variable, a mounting frame, a hub on said frame, a collar mounted for free rotation on an exterior surface of a portion of said hub, the exterior surface of said collar being of such diameter as to be tightly engageable with the central opening of said chart, timing means engageable with said chart near its periphery for driving said charft at constant angular velocity, a deflectable member, a mounting therefor removably positioned on said frame, and means extending through said hub for deflecting said member.

12. In an instrument for producing upon a circular chart a record of a measured variable, means engageable by a central opening of said chart to provide a free-running bearing therefor, a constant-speed motor, a wheel driven thereby and engageable with a surface of said chart near the periphery thereof, a roller engageable with the opposite surface of said chart to effect firm engagement between said chart and said wheel, means urging said roller out of engagement with said chart, a deflectable member, means on said frame for deflecting said member, a mounting for said deflectable member normally connecting the latter to said deflecting means but shiftable to disconnect said member from said deflecting means, swinging bracket means engaging said mounting and supporting the latter when said mounting is shifted to disconnect said deflectable member from said deflecting means, and means carried by said bracket means for forcing said roller into engagement with said chart during movement of said mounting into position for connecting said deflectable member to said deflecting means.

13. In an instrument for producing upon a circular chart a record of a measured variable, a constant-speed motor, a wheel driven thereby and engageable with a surface of said chart, a roller engageable with the opposite surface of said chart to effect firm engagement between said chart and said wheel, means urging said roller out of engagement with said chart, a deflectable member, means on said frame for deflecting said member, a mounting for said member normally connecting the latter to said deflecting means, swinging bracket means engaging said mounting and supporting the latter when said mounting is shifted to disconnect said deflectable member from said deflecting means, and means carried by said bracket means for forcing said roller into engagement with said chart during movement of said mounting into position for connecting said deflectable member to said deflecting means.

14. In an instrument for producing upon a circular chart a record of a measured variable, means engageable by a central opening of said chart to provide a free-running bearing therefor, timing means engageable with said chart near its periphery for driving said chart at constant angular velocity, a recording member adapted to inscribe a record upon a surface of said chart, a measuring element responsive to magnitudes of said variable, means connecting said recording member and said measuring element to render the former responsive to magnitudes measured by the latter, a deflectable member, an element extending along the axis of said bearing, means for causing said element to transmit motion to said deflectable member, and means for operating said element through extent correlated with said magnitudes for correspondingly actuating said deflectable member.

15. In an instrument for producing upon a circular chart a record of a measured variable, a mounting frame, a hub on said frame, secured in a stationary relation thereto, a free-running central bearing for said chart mounted on said hub, timing means engageable with said chart near its periphery for driving said chart at constant angular velocity, a recording member adapted to inscribe a record upon a surface of said chart, a measuring element responsive to magnitudes of said variable, means connecting said recording member to said measuring element to render the former responsive to magnitudes measured by the latter, a deflectable member, an arbor extending through said hub, means for causing said arbor to transmit motion to said deflectable member, and means for operating said arbor through extents correlated with said magnitudes for correspondingly actuating said deflectable member, said hub preventing the application of torque to said arbor and said deflectable member by said rotating chart and its bearing.

16. In an instrument for producing upon a circular chart a record of a measured variable, a mounting frame, a hub secured thereto, a free-running central bearing for said chart mounted on said hub, timing means engageable with said chart near its periphery for driving said chart at constant angular velocity, a recording member adapted to inscribe a record upon a surface of said chart, a measuring element, mechanical means interconnecting said recording member and measuring element to render the former responsive to measurements performed by the latter, an arbor journalled in said hub, a removable member adapted to engage said arbor for rotation therewith, means for establishing register between said removable member and said arbor in a predetermined relationship, means for exerting a force to maintain said removable member and said arbor in operative engagement, and a bracket member hingedly mounted on said frame and having an intermediate loop portion loosely encircling said removable member when the latter is in its operating position and adapted to support said member when the latter is removed from said arbor, said intermediate loop portion yieldingly supporting said member upon removal from said arbor whereby said member may be completely removed from said bracket.

17. In an instrument for producing upon a circular chart a record of a measured variable, a mounting frame, a hub secured thereto, a free-running central bearing for said chart mounted on said hub, timing means engageable with said chart near its periphery for driving said chart at constant angular velocity, a recording member adapted to inscribe a record upon a surface of said chart, a measuring element, mechanical means interconnecting said recording member and measuring element to render the former responsive to measurements performed by the latter, an arbor journalled in said hub, a removable member adapted to engage said arbor for rotation therewith, means for establishing register between said removable member and said arbor in a predetermined relationship, magnetic means for exerting a force to maintain said removable member and said arbor in operative engagement, and a bracket hingedly mounted on said frame and having a loop portion engaging said removable member for supporting the same when removed from said arbor.

18. In an instrument for producing upon a circular chart a record of a measured variable, constant-speed motor means, a wheel operable by said motor means and having a roughened outer surface for frictionally engaging a surface of said chart adjacent to the periphery of said chart, said wheel being oriented to apply a component of force perpendicular to the engaged radius of said chart, for rotating said chart, a wheel engageable with the opposite surface of said chart, opposite said first-mentioned wheel, one of said wheels having a wider chart-engaging surface than the other of said wheels, said other wheel having a chart-engaging surface sufficiently narrow to provide substantially a line contact with said chart as said chart is rotated, and means for adjusting the position of said other wheel radially of said chart to determine the effective radius of action of said wheels upon said chart and thereby establish the angular speed of said chart.

19. In an instrument for producing upon a circular chart a record of a measured variable, a frame, means engageable by a central opening of said chart to provide a free-running bearing therefor, a constant-speed motor, a wheel driven thereby and engageable with a surface of said chart near the periphery thereof, a roller engageable with the opposite surface of said chart to effect firm engagement between said chart and said wheel, spring means urging said roller out of engagement with said chart, bracket means swingably mounted on said frame, adapted to be swung to an operating position and away therefrom, and means comprising a threaded member carried by said bracket means, adjustable in position with respect to said bracket means, for forcing said roller into engagement with said chart when said bracket means is swung into operating position.

References Cited in the file of this patent
UNITED STATES PATENTS

| Number | Name | Date |
|---|---|---|
| 690,059 | Isham | Dec. 31, 1901 |
| 1,624,887 | Bristol | Apr. 12, 1927 |
| 2,074,117 | Ross | Mar. 16, 1937 |
| 2,286,346 | Clausen | June 16, 1942 |
| 2,296,870 | Proctor et al. | Sept. 29, 1942 |
| 2,417,339 | Woolley | Mar. 11, 1947 |
| 2,475,573 | Smith et al. | July 5, 1949 |